United States Patent [19]

Ness-Cohn et al.

[11] Patent Number: 5,003,629
[45] Date of Patent: Mar. 26, 1991

[54] ARRANGEMENT FOR IDENTIFYING SUBSCRIBERS

[75] Inventors: David J. Ness-Cohn, Lisle; Lewis H. Rosenthal, Buffalo Grove; Randy L. Ekl, Palatine; Gregory N. Hesse, Hanover Park; Katherine B. Roane, Glenview, all of Ill.; David Bar-On, Tel Aviv, Israel

[73] Assignee: Motorola, Inc., Schaumburg, Ill.

[21] Appl. No.: 292,288

[22] Filed: Dec. 30, 1988

[51] Int. Cl.$^5$ ............................................. H04B 7/26
[52] U.S. Cl. ..................................... 455/54; 455/56; 455/33; 379/59; 379/63
[58] Field of Search ........................ 455/53, 54, 55, 56, 455/33, 11, 14, 88, 89; 379/59, 62, 63

[56] References Cited

U.S. PATENT DOCUMENTS

| | | | |
|---|---|---|---|
| 4,466,125 | 8/1984 | Kanayama | 455/56 |
| 4,485,486 | 11/1984 | Webb et al. | 455/56 |
| 4,593,155 | 6/1986 | Hawkins | 455/89 |
| 4,742,560 | 5/1988 | Arai | 455/33 |
| 4,876,738 | 10/1989 | Selby | 455/33 |

Primary Examiner—Douglas W. Olms
Assistant Examiner—Ralph Smith
Attorney, Agent, or Firm—Wayne J. Egan

[57] ABSTRACT

In a multiple RF communication system arrangement wherein a subscriber has a first identification number (ID) within a first RF communication system, and wherein the subscriber has a second ID within a second RF communication system, an arrangement (400) is provided for the subscriber to uniquely identify itself by means of a third ID to a console serving both the first and second RF communication systems.

10 Claims, 2 Drawing Sheets

UNIVERSAL ID ARRANGEMENT

RF COMMUNICATION SYSTEM

— PRIOR ART —

— PRIOR ART —

RF COMMUNICATION SYSTEM ARRANGED WITH A CONSOLE

FIRST DATA BASE ARRANGEMENT

SECOND DATA BASE ARRANGEMENT

TWO RF COMMUNICATION SYSTEMS ARRANGED WITH A SINGLE CONSOLE

UNIVERSAL ID ARRANGEMENT

THIRD DATA BASE ARRANGEMENT

ARRANGEMENT FOR IDENTIFYING SUBSCRIBERS

BACKGROUND OF THE INVENTION

This invention pertains to RF communication systems or, more particularly, to a method of identifying subscribers in RF communication systems.

Modern-day radio frequency (RF) communication systems can be understood with reference to FIG. 1, which depicts a typical RF communication system (100). As shown, the RF communication system includes fixed equipment (3) arranged to facilitate communication between subscriber A (1) and subscriber B (2). Such systems typically identify subscribers by providing each subscriber an identification number (ID) unique within the system. As depicted in FIG. 1, subscriber A has identification $ID_A$ (43) and subscriber B has identification number $ID_B$ (44).

Certain RF systems also include a console. Such an arrangement (200) is shown in FIG. 2, which depicts a typical RF communication system equipped with a console (8) connected to the RF communication system's fixed equipment (6) via a suitable link (7). Since identification numbers $ID_A$ and $ID_B$ have been assigned so they are unique within the RF communication system, these numbers are also unique to the console and, as a result, the console is able to identify a subscriber on the basis of a single ID.

There are certain situations, however, where it may be desireable to connect the same console to more than one RF communication system. This arrangement (300) is depicted in FIG. 3, which shows a single console (11) connected to the fixed equipment (14) of a first communication system via a first link (12), and connected to the fixed equipment (15) of a second RF communication system via a second link (13).

In such an arrangement, it may be desireable for one or more subscribers to be capable of communicating in both RF communication systems. Such a subscriber is depicted as subscriber N (16) in FIG. 3. With this arrangement, when subscriber N communicates in the first RF communication system, it will use a first ID, that is, $ID_N\#1$ (45) to identify itself and, when subscriber N communicates in the second RF communication system, it will use a second ID, that is, $ID_N\#2$ (46) to identify itself. Also with this arrangement, whenever such a subscriber identifies itself to the console, the ID it uses will vary according to which system it is currently operating in. As a result, the console will not be able to identify such a subscriber on the basis of a single ID.

As a result of the foregoing, the inventor has discovered it would be desireable to have an improved way of identifying such subscribers to a console in a multiple-RF communication system arrangement.

SUMMARY OF THE INVENTION

Therefore, according to the invention, a method is provided, and an apparatus described, for a subscriber in a multiple-RF communication system arrangement to uniquely identify itself to a console. Also, a method is provided, and an apparatus described, for a console to uniquely identify an individual subscriber to a multiple-RF communication system arrangement.

In one embodiment the apparatus and method includes and makes use of a data base that assists in interfacing a console user that wishes to use only a single ID for each subscriber, and a subscriber that has more than one ID to facilitate its operation in multiple systems.

BRIEF DESCRIPTION OF THE DRAWINGS SHOWING THE INVENTION

DETAILED DESCRIPTION OF THE INVENTION

Figure 4:
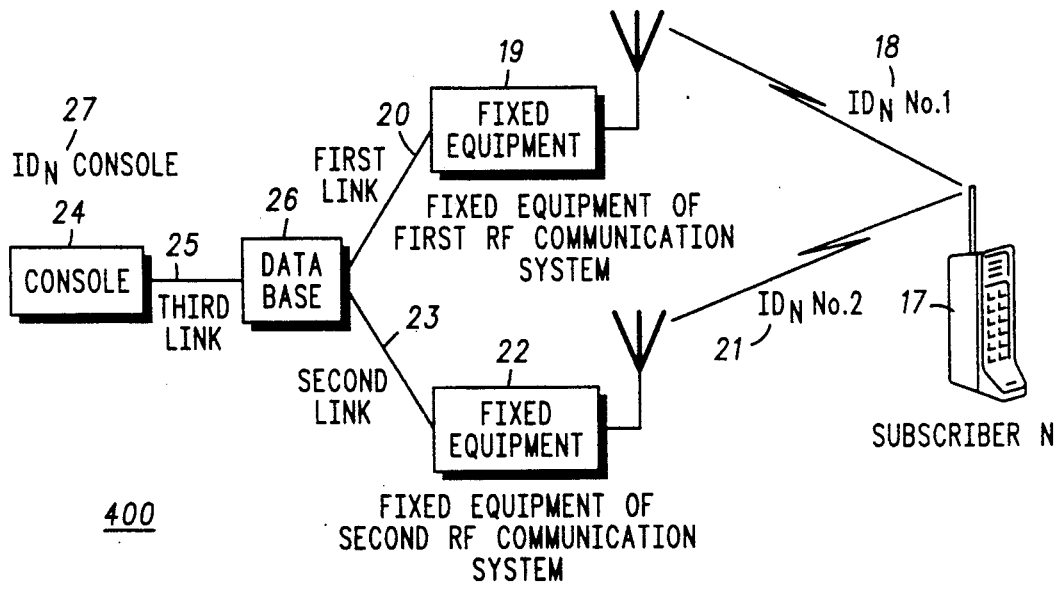
FIG. 4 depicts an universal ID arrangement.

The universal ID arrangement (400) is shown in FIG. 4. The figure depicts the fixed equipment (19) of a first RF communication system connected to a console (24) by means of a first link (20), a data base (26) and a third link (25). Also, the fixed equipment (22) of a second RF communication system is connected to the console by means of a second link (23), the data base (26), and the third link (25). In the figure, subscriber N (17) is a typical subscriber capable of communicating in both RF communication systems. In the arrangement (400), subscriber N (17) is provided with three IDs: $ID_N\#1$ (18), which is unique within the first RF communication system; $ID_N\#2$ (21), which is unique within the second RF communication system; and $ID_N CONSOLE$ (27), which is unique within the console (24).

Referring to FIG. 4, when the console (24) wishes to identify subscriber N (17) to the first and second communication systems, it transmits $ID_N CONSOLE$ (27) to the data base (26) via the third link (25). The data base, upon receipt of $ID_N CONSOLE$ (27), generates $ID_N\#1$ (18) and $ID_N\#2$ (21), using the first data base arrangement (500) of FIG. 5, which will be discussed below. The data base (26) then transmits $ID_N\#1$ (18) to the fixed equipment (19) of the first communication system via the first link (20), and $ID_N\#2$ (21) to the fixed equipment (22) of the second communication system via the second link (23).

Figure 1:
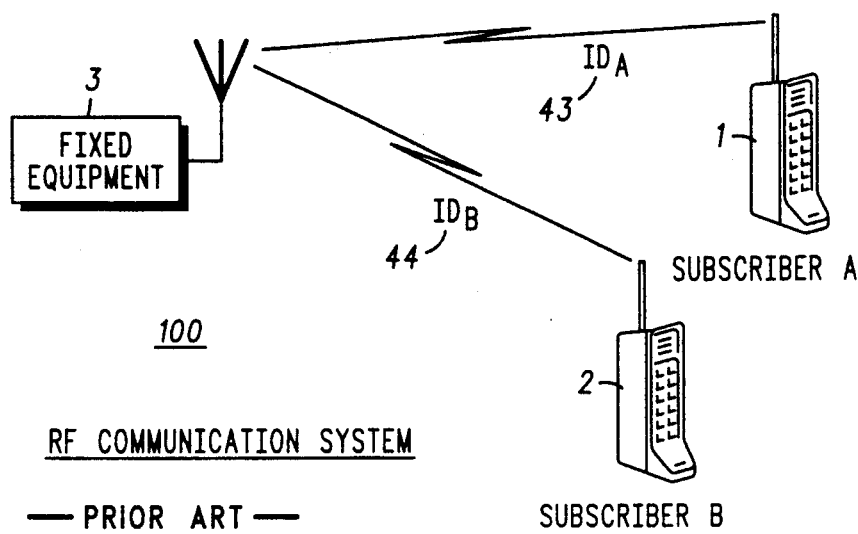
FIG. 1 depicts a typical RF communication system, as in the prior art.
Figure 2:
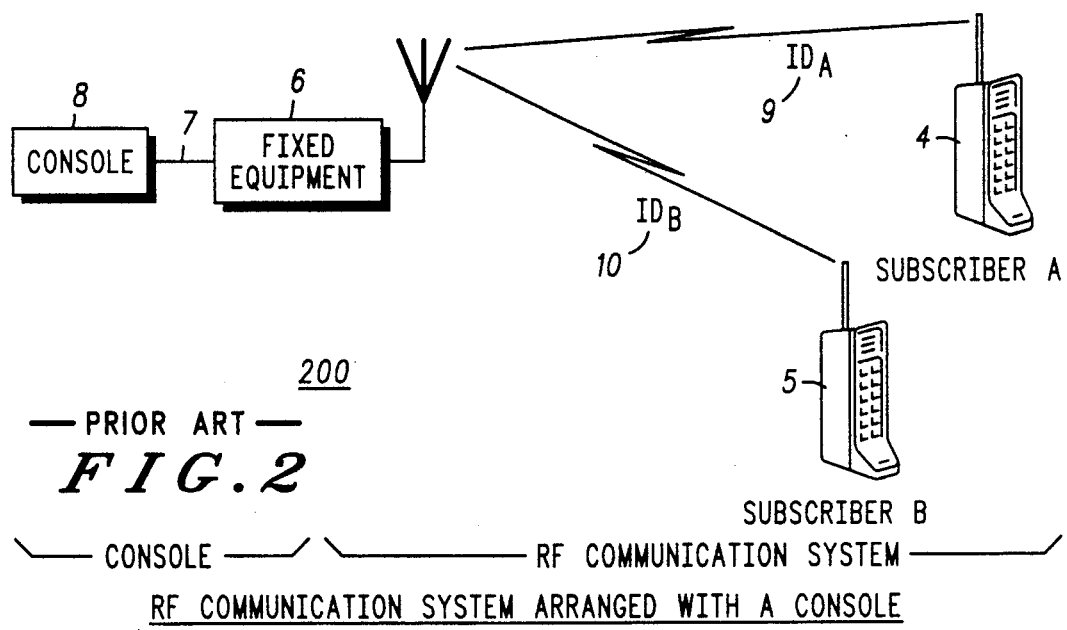
FIG. 2 depicts a typical RF communication system arranged with a console, as in the prior art.
Figure 5:
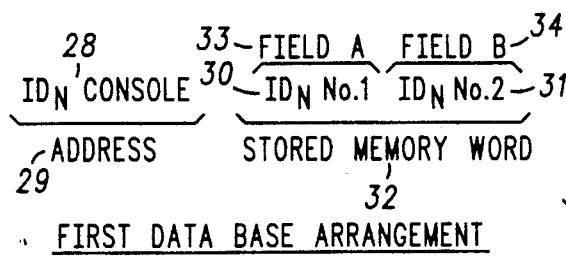
FIG. 5 depicts a first data base arrangement.

Referring to FIG. 5, this figure depicts the first data base arrangement (500) of the data base (26). As shown, this arrangement (500) provides a method for mapping subscriber N's $ID_N CONSOLE$ (28) onto subscriber N's associated $ID_N\#1$ (30) and $ID_N\#2$ (31). Those skilled in the art will appreciate that the data base (26) is arranged so that $ID_N CONSOLE$ (28) forms a particular address (29) in the data base (26), with a particular memory word (32) stored at that address. The memory word (32), in turn, comprises field A (33) and field B (34), with field A (33) containing $ID_N\#1$ (30) and field B (34) containing $ID_N\#2$ (31).

Referring again to FIG. 4, when subscriber N (17) is operating in the first communication system and wishes to identify itself to the console (24), it transmits $ID_N\#1$ (18) to the fixed equipment (19) of the first communication system which, in turn, transmits $ID_N\#1$ to the data base (26) via the first L. link (20). The data base, upon receiving $ID_N\#1$ via the first link, generates $ID_N CONSOLE$ (27), using the second data base arrangement (600) which will be discussed below. The data base (26)

then transmits $ID_N$CONSOLE (27) to the console (24) via the third link (25).

Figure 6:
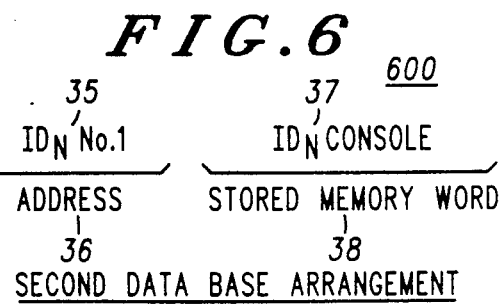
FIG. 6 depicts a second data base arrangement.
Figure 3:
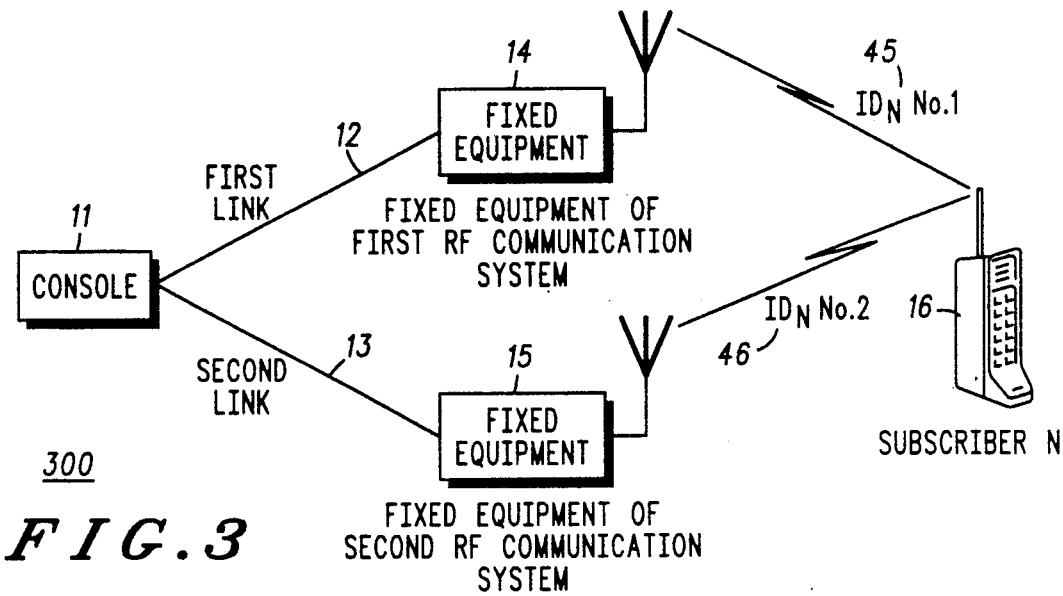
FIG. 3 depicts two typical RF communication systems arranged with a single console.

Referring to FIG. 6, this figure depicts the second data base arrangement (600) of the data base (26). As shown by the figure, this arrangement provides a method for mapping subscriber N's $ID_N$#1 (35) onto subscriber N's associated $ID_N$CONSOLE (37). Those skilled in the art will appreciate that the data base (26) is arranged so that $ID_N$#1 (35) forms a particular address (36) in the data base (26), with a particular memory word (38) stored at that address. The memory word (38), in turn, contains $ID_N$CONSOLE (37).

Referring again to FIG. 4, when subscriber N (17) is operating in the second communication system and wishes to identify itself to the console (24), it transmits $ID_N$#2 (21) to the fixed equipment (22) of the second communication system which, in turn, transmits $ID_N$#2 to the data base (26) via the second link (23). The data base, upon receiving $ID_N$#2 via the second link, generates $ID_N$CONSOLE (27), using the third data base arrangement (700) which will be discussed below. The data base (26) then transmits $ID_N$CONSOLE (27) to the console (24) via the third link (25).

Figure 7:
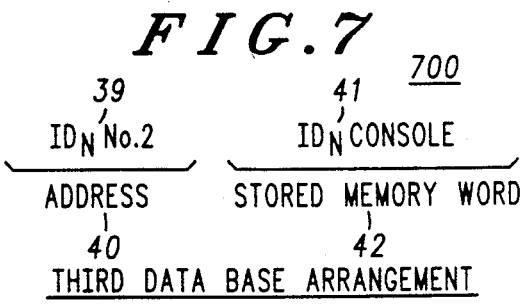
FIG. 7 depicts a third data base arrangement.

Referring to FIG. 7, this figure depicts the third data base arrangement (700) of the data base (26). As shown by the figure, this arrangement provides a method for mapping subscriber N's $ID_N$#2 (39) onto subscriber N's associated $ID_N$CONSOLE (41). Those skilled in the art will appreciate that the data base (26) is arranged so that $ID_N$#2 (39) forms a particular address (40) in the data base (26), with a particular memory word (42) stored at that address. The memory word (42), in turn, contains $ID_N$CONSOLE (41).

Those skilled in the art will appreciate that the present invention is applicable with any type of RF communication system employing subscriber IDs, including trunked RF communication systems and conventional RF communication systems.

I claim:

1. In an arrangement of communication systems comprising a first RF communication system, a second RF communication system, a console and a data base, said data base coupled to said first RF communication system via a first link and coupled to said second RF communication system via a second link, and coupled to said console via a third link, a method for identifying subscribers, that have a first ID usable with said first RF communication system, a second ID usable with said second RF communication system, and a console ID usable with said console, said method comprising the steps of: at said console:
   (a) transmitting said console ID to said data base via said third link; at said data base:
   (b) receiving said console ID from said third link, and thereafter providing an address based on said console ID, and thereafter generating a memory word stored at said address, said memory word including said first ID and said second ID;
   (c) transmitting said first ID to said first RF communication system via said first link; and
   (d) transmitting said second ID to said second RF communication system via said second link.

2. The method for identifying subscribers of claim 1, said memory word including a first data field and a second data field.

3. The method for identifying subscribers of claim 2, said first data field including said first ID and second data field including said second ID.

4. The method for identifying subscribers of claim 3 wherein said first RF communication system and said second RF communication system are trunked-type.

5. In an arrangement of communication systems comprising a first RF communication system, a second RF communication system, a console and a data base, said data base coupled to said first RF communication system via a first link and coupled to second RF communication system via a second link, and coupled to said console via a third link, a method for identifying subscribers that have a first ID usable with said first RF communication system a second ID usable with said second RF communication system, and a console ID usable with said console, said method comprising the steps of:
   at said first RF communication system:
   (a) receiving said first ID;
   (b) transmitting said first ID to said data base via said first link;
   at said second RF communication system:
   (c) receiving said second ID;
   (d) transmitting said second ID to said data base via said second link;
   at said data base:
   (e) receiving said first ID from said first link, and thereafter providing a first address based on said first ID, and thereafter generating a first memory word stored at said first address, said first memory word including said console ID;
   (f) receiving said second ID from said second link, and thereafter providing a second address based on said second ID, and thereafter generating a second memory word stored at said second address, said second memory word including said console ID; and
   (g) transmitting said console ID to said console via said third link.

6. An arrangement comprising:
   a first RF communication system, a second RF communication system, a console and a data base, said arrangement comprising said data base coupled to said first RF communication system via a first link and connected to said second RF communication system via a second link, and connected to said console via a third link,
   and further comprising one or more subscribers each having a first ID usable with said first RF communication system, a second ID usable with said second RF communication system, and a console ID usable with said console,
   said console having means for transmitting said console ID to said data base via said third link;
   said data base having:
   means for receiving said console ID from said third link, and for thereafter providing an address based on said console ID, and for thereafter generating a memory word stored at said address, said memory word including said first ID and said second ID and
   means for transmitting said first ID to said first RF communication system via said first link and
   means for transmitting said second ID to said second RF communication system via said second link.

7. The arrangement of claim 6, said memory word including a first data field and a second data field.

8. The arrangement of claim 7, said first data field including said first ID and second data field including said second ID.

9. The arrangement of claim 8 wherein said first RF communication system and said second RF communication system are trunked-type.

10. An arrangement comprising:
   a first RF communication system, a second RF communication system, a console and a data base said data base coupled to said first RF communication system via a first link and coupled to said second RF communication system via a second link, and couple tosaid console via a third link,
   and further comprising one or more subscribers each having a first ID usable with said first RF communication system, a second ID usable with said second RF communication system, and a console ID usable with said console,
   said first RF communication system having means for receiving said first ID and for transmitting said first ID to said data base via said first link;
   said second RF communication system having means for receiving said second ID and for transmitting said second ID to said data base via said second link;
   said data base having:
   means for receiving said first ID from said first link and for thereafter providing a first address based on said first ID and for thereafter generating a first memory word stored at said first address, said first memory word including said console ID and
   means for receiving said second ID from said second link and for thereafter providing a second address based on said second ID, and for thereafter generating a second memory word stored at said second address, said second memory word including said console ID and
   means for transmitting said console ID to said console via said third link.

* * * * *

UNITED STATES PATENT AND TRADEMARK OFFICE
CERTIFICATE OF CORRECTION

PATENT NO. : 5,003,629

DATED : March 26, 1991

INVENTOR(S) : David J. Ness-Cohn et al.

It is certified that error appears in the above-identified patent and that said Letters Patent is hereby corrected as shown below:

At column 4, line 12, "system a" should be --system, a--.

Column 5, line 10, "couple to said" should be --coupled to said--.

Signed and Sealed this

Nineteenth Day of January, 1993

Attest:

DOUGLAS B. COMER

*Attesting Officer*                *Acting Commissioner of Patents and Trademarks*